United States Patent
Jitsui (10) Patent No.: US 12,468,209 B2
(45) Date of Patent: Nov. 11, 2025

(54) VIEWING ANGLE CONTROLLING DEVICE

(71) Applicant: InnoLux Corporation, Miao-Li County (TW)

(72) Inventor: Kazuto Jitsui, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 184 days.

(21) Appl. No.: 18/234,867

(22) Filed: Aug. 16, 2023

(65) Prior Publication Data

US 2025/0060646 A1    Feb. 20, 2025

(51) Int. Cl.
  *G02F 1/29*    (2006.01)
(52) U.S. Cl.
  CPC ..................... *G02F 1/29* (2013.01)
(58) Field of Classification Search
  CPC ........................................... G02F 1/29
  See application file for complete search history.

(56) References Cited

U.S. PATENT DOCUMENTS

2022/0091464 A1*  3/2022  Kimura ............ G02F 1/134372
2023/0101325 A1   3/2023  Murata

* cited by examiner

*Primary Examiner* — Anne M Hines
(74) *Attorney, Agent, or Firm* — Winston Hsu (57) ABSTRACT

A viewing angle controlling device includes a first substrate, a second substrate disposed opposite to the first substrate, a viewing angle controlling medium disposed between the first substrate and the second substrate, a first alignment layer disposed between the first substrate and the viewing angle controlling medium and having a first anchoring strength, a second alignment layer disposed between the second substrate and the viewing angle controlling medium and having a second anchoring strength, a first polarizer, and a compensation layer disposed between the first polarizer and the viewing angle controlling medium. The first substrate is disposed between the first polarizer and the first alignment layer. The first anchoring strength is less than the second anchoring strength.

19 Claims, 9 Drawing Sheets

VIEWING ANGLE CONTROLLING DEVICE

BACKGROUND OF THE DISCLOSURE

1. Field of the Disclosure

The present disclosure relates to a viewing angle controlling device, and more particularly to a viewing angle controlling device capable of providing privacy function.

2. Description of the Prior Art

Privacy devices can be applied to various types of electronic devices such as display devices. However, in the display devices including traditional privacy devices, the brightness of the display devices in normal display mode may be affected by the privacy devices to be insufficient, or the performance of the privacy devices in privacy mode of the display devices is not good enough. Therefore, to improve the performance of the privacy device is still an important issue in the present field.

SUMMARY OF THE DISCLOSURE

In some embodiments, a viewing angle controlling device is provided by the present disclosure. The viewing angle controlling device includes a first substrate, a second substrate disposed opposite to the first substrate, a viewing angle controlling medium disposed between the first substrate and the second substrate, a first alignment layer disposed between the first substrate and the viewing angle controlling medium and having a first anchoring strength, a second alignment layer disposed between the second substrate and the viewing angle controlling medium and having a second anchoring strength, a first polarizer, and a compensation layer disposed between the first polarizer and the viewing angle controlling medium. The first substrate is disposed between the first polarizer and the first alignment layer. The first anchoring strength is less than the second anchoring strength.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented. When an element or a layer is referred to as being "electrically connected" to another element or layer, it can be a direct electrical connection or an indirect electrical connection. The electrical connection or coupling described in the present disclosure may refer to a direct connection or an indirect connection. In the case of a direct connection, the ends of the elements on two circuits are directly connected or connected to each other by a conductor segment. In the case of an indirect connection, switches, diodes, capacitors, inductors, resistors, other suitable elements or combinations of the above elements may be included between the ends of the elements on two circuits, but not limited thereto.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

According to the present disclosure, the thickness, length and width may be measured through optical microscope, and the thickness or width may be measured through the cross-sectional view in the electron microscope, but not limited thereto.

In addition, any two values or directions used for comparison may have certain errors. In addition, the terms "equal to", "equal", "the same", "approximately" or "substantially" are generally interpreted as being within ±20%, ±10%, ±5%, ±3%, ±2%, ±1%, or ±0.5% of the given value.

In addition, the terms "the given range is from a first value to a second value" or "the given range is located between a first value and a second value" represents that the given range includes the first value, the second value and other values there between.

If a first direction is said to be perpendicular to a second direction, the included angle between the first direction and the second direction may be located between 80 to 100 degrees. If a first direction is said to be parallel to a second direction, the included angle between the first direction and the second direction may be located between 0 to 10 degrees.

Unless it is additionally defined, all terms (including technical and scientific terms) used herein have the same meaning as commonly understood by those ordinary skilled in the art. It can be understood that these terms that are defined in commonly used dictionaries should be interpreted as having meanings consistent with the relevant art and the background or content of the present disclosure, and should not be interpreted in an idealized or overly formal manner, unless it is specifically defined in the embodiments of the present disclosure.

It should be noted that the technical features in different embodiments described in the following can be replaced, recombined, or mixed with one another to constitute another embodiment without departing from the spirit of the present disclosure.

The electronic device of the present disclosure may include a viewing angle controlling device, and the viewing angle controlling device can be applied to other electronic device. The electronic device may include a display device, a sensing device, a back-light device, an antenna device, a tiled device or other suitable electronic devices, but not limited thereto. The electronic device may be a foldable electronic device, a flexible electronic device or a stretchable electronic device. The display device may for example be applied to laptops, common displays, tiled displays, vehicle displays, touch displays, televisions, monitors, smart phones, tablets, light source modules, lighting devices or electronic devices applied to the products mentioned above, but not limited thereto. The sensing device may for example include a biosensor, a touch sensor, a fingerprint sensor, other suitable sensors or combinations of the above-mentioned sensors. The antenna device may for example include a liquid crystal antenna device or a non-liquid crystal antenna device, but not limited thereto. The tiled device may for example include a tiled display device or a tiled antenna device, but not limited thereto. It should be noted that the electronic device may be combinations of the above-mentioned devices, but not limited thereto. The outline of the viewing angle controlling device may be a rectangle, a circle, a polygon, a shape with curved edge or other suitable shapes, according to the demands of the design.

Figure 1:
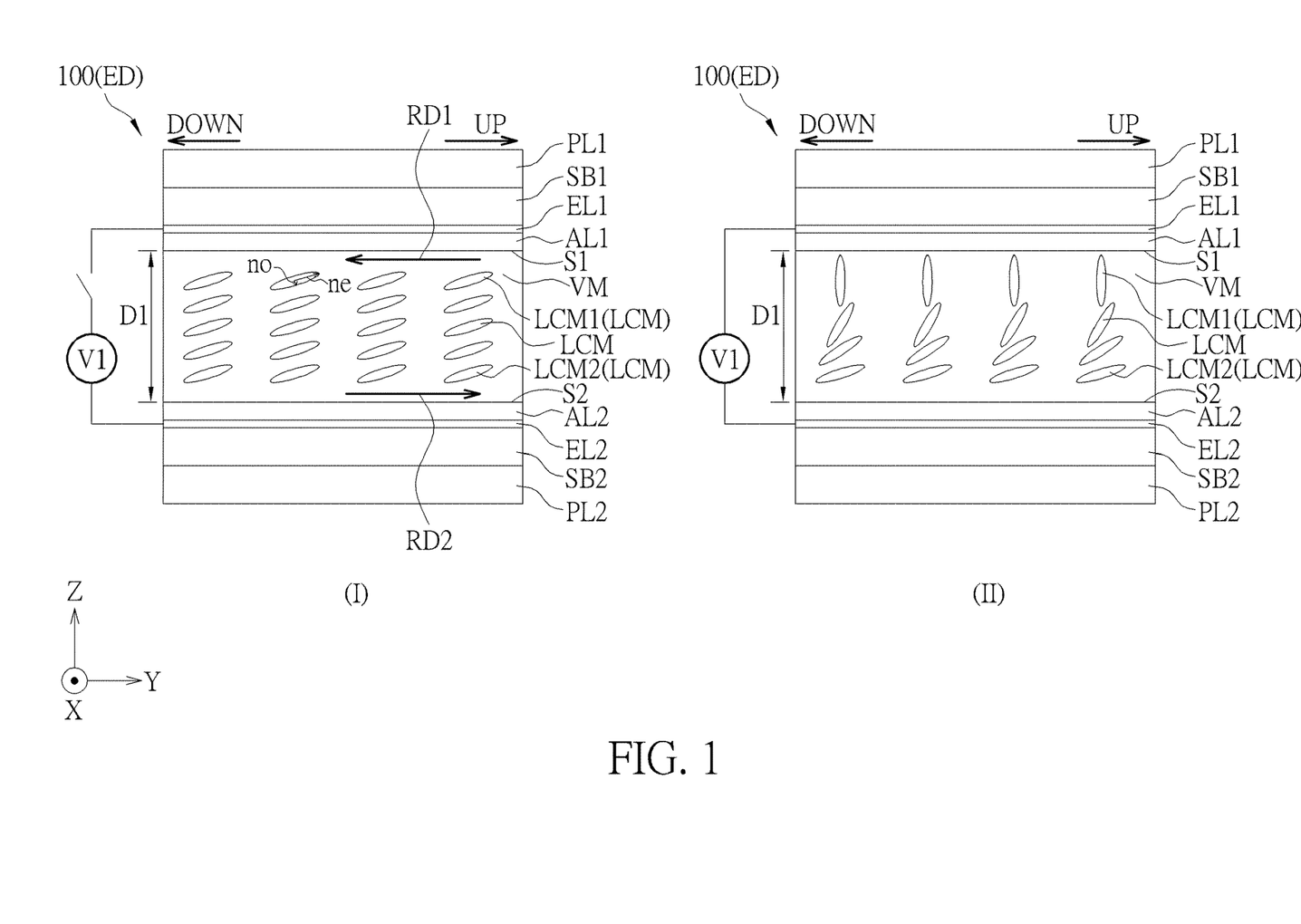
FIG. 1 schematically illustrates a cross-sectional view of an electronic device according to a first embodiment of the present disclosure.
Figure 2:
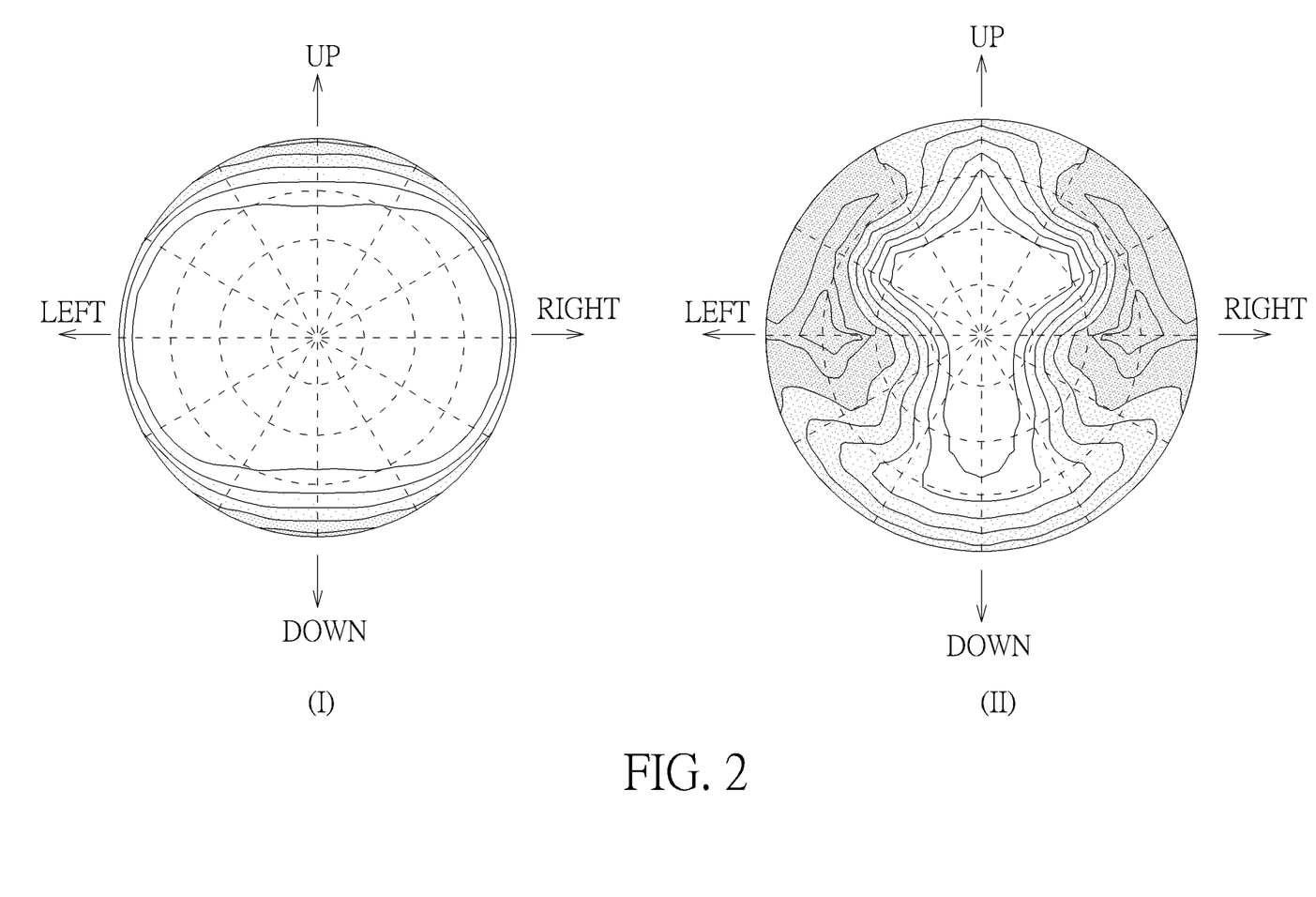
FIG. 2 schematically illustrates luminance contours of the electronic device respectively in a sharing mode and a privacy mode according to the first embodiment of the present disclosure.

Referring to FIG. 1 and FIG. 2, FIG. 1 schematically illustrates a cross-sectional view of an electronic device according to a first embodiment of the present disclosure, and FIG. 2 schematically illustrates luminance contours of the electronic device respectively in a sharing mode and a privacy mode according to the first embodiment of the present disclosure. The electronic device ED of the present disclosure may include a viewing angle controlling device 100, wherein the viewing angle controlling device 100 may be applied to any suitable electronic device. As shown in FIG. 1, the viewing angle controlling device 100 includes a first substrate SB1, a second substrate SB2 disposed opposite to the first substrate SB1, a viewing angle controlling medium VM disposed between the first substrate SB1 and the second substrate SB2, a first alignment layer AL1 disposed between the first substrate SB1 and the viewing angle controlling medium VM, a second alignment layer AL2 disposed between the second substrate SB2 and the viewing angle controlling medium VM, a first polarizer PL1, and a second polarizer PL2. The first substrate SB1 is disposed between the first polarizer PL1 and the first alignment layer AL1. The second substrate SB2 is disposed between the second polarizer PL2 and the second alignment layer AL2. The above-mentioned elements and layers will be detailed in the following.

The first substrate SB1 and the second substrate SB2 may include any suitable transparent material. Therefore, the light can pass through the first substrate SB1 and the second substrate SB2 without being shielded or absorbed by these substrates. The first substrate SB1 and the second substrate SB2 may respectively include a rigid substrate or a flexible substrate. The rigid substrate may include glass, quartz, sapphire, ceramic, other suitable materials or combinations of the above-mentioned materials. The flexible substrate may include polyimide (PI), polycarbonate (PC), polyethylene terephthalate (PET), other suitable materials or combinations of the above-mentioned materials. Although the first substrate SB1 and the second substrate SB2 respectively include a single-layer structure in FIG. 1, the present disclosure is not limited thereto. In some embodiments, the first substrate SB1 and the second substrate SB2 may respectively include a multi-layer structure.

In the present embodiment, the viewing angle controlling medium VM may be disposed between the first alignment layer AL1 and the second alignment layer AL2. Specifically, the viewing angle controlling medium VM may be sandwiched between the first alignment layer AL1 and the second alignment layer AL2. The viewing angle controlling medium VM may include any suitable material capable of controlling the view angle of an electronic device to which the viewing angle controlling device 100 is applied. Specifically, the viewing angle controlling medium VM may include any suitable light modulating material. According to the present embodiment, the viewing angle controlling medium VM may include a liquid crystal layer, wherein the liquid crystal layer includes a plurality of liquid crystal molecules LCM. In the present embodiment, the liquid crystal molecules LCM may be positive liquid crystal molecules, but not limited thereto.

The viewing angle controlling medium VM (the liquid crystal layer) has a retardation RE, wherein the retardation RE can be obtained through the following formula (1):

$$RE = \Delta n * D1 \qquad (1)$$

wherein $\Delta n$ is obtained by subtracting the ordinary refractive index "no" from the extraordinary refractive index "ne" (that is, $\Delta n = ne - no$) of the liquid crystal molecules LCM, and D1 is the thickness D1 of the viewing angle controlling medium VM (i.e. the thickness of the liquid crystal layer in FIG. 1). According to the present embodiment, the retardation RE of the viewing angle controlling medium VM may be greater than or equal to 1000 nanometers (nm). In some embodiments, the retardation RE of the viewing angle controlling medium VM may be greater than or equal to 1100 nm. In some embodiments, the retardation RE of the viewing angle controlling medium VM may be greater than or equal to 1200 nm. By making the retardation of the viewing angle controlling medium VM within the above-mentioned ranges, the privacy effect provided by the viewing angle controlling device 100 (which will be detailed in the following) may be improved.

The first alignment layer AL1 and the second alignment layer AL2 may be disposed adjacent to the viewing angle controlling medium VM to make the liquid crystal molecules LCM aligned along a specific direction. According to the present embodiment, the first alignment layer AL1 has a first anchoring strength, and the second alignment layer AL2 has a second anchoring strength, wherein the first anchoring strength is different from the second anchoring strength. Specifically, the first anchoring strength of the first alignment layer AL1 is less than the second anchoring strength of the second alignment layer AL2. The anchoring strength of an alignment layer represents the intermolecular force between the molecules on the surface of the alignment layer and the liquid crystal molecules LCM. That is, "the first anchoring strength is less than the second anchoring strength" mentioned above may represent that the intermolecular force between the molecules on the surface S1 of the first alignment layer AL1 and the liquid crystal molecules LCM is lower than the intermolecular force between the molecules on the surface S2 of the second alignment layer AL2 and the liquid crystal molecules LCM.

In the present embodiment, the first anchoring strength is less than $1.0*10^{-6}$ J/m². In some embodiments, the first anchoring strength is less than $8.0*10^{-7}$ J/m². In some embodiments, the first anchoring strength is less than $6.0*10^{-7}$ J/m². In addition, in the present embodiment, the second anchoring strength is greater than $1.0*10^{-4}$ J/m², but not limited thereto. In some embodiments, the second anchoring strength is greater than $1.2*10^{-4}$ J/m². In some embodiments, the second anchoring strength is greater than $1.4*10^{-4}$ J/m².

In some embodiments, the first alignment layer AL1 and the second alignment layer AL2 may include different materials, such that the first anchoring strength and the second anchoring strength are different. For example, the material of the second alignment layer AL2 may include polyimide, polyacrylic acid or other suitable materials, and the first alignment layer AL1 may include any suitable material different from the material of the second alignment layer AL2. In some embodiments, the rubbing angle of the first alignment layer AL1 and the rubbing angle of the second alignment layer AL2 may be different, such that the first anchoring strength and the second anchoring strength are different. The first anchoring strength can be designed to be different from the second anchoring strength in other suitable ways, which is not limited to the above-mentioned ways.

As shown in FIG. 1, in the present embodiment, the surface S2 of the second alignment layer AL2 may be rubbed along a direction parallel to the direction Y. In the present disclosure, the direction can also be expressed in angle, wherein the direction X may be defined as 0 degree, the direction Y may be defined as 90 degrees, the direction-X may be defined as 180 degrees, and the direction-Y may be defined as 270 degrees. Accordingly, the surface S2 of the second alignment layer AL2 may be rubbed along a direction of 90 degrees or 270 degrees in the present embodiment. For example, as shown in FIG. 1, the rubbing direction RD2 of the second alignment layer AL2 may be the direction Y, or the direction of 90 degrees, but not limited thereto. The direction expressed in angle in the following may refer to the definition mentioned above, and will not be redundantly described.

In the present embodiment, the surface S1 of the first alignment layer AL1 may be rubbed along a direction opposite to the rubbing direction RD2 of the second alignment layer AL2. For example, as shown in FIG. 1, the rubbing direction RD1 of the first alignment layer AL1 may be opposite to the rubbing direction RD2 of the second alignment layer AL2, that is, the direction-Y, or the direction of 270 degrees, but not limited thereto. In some embodiments, the surface S1 of the first alignment layer AL1 is not rubbed while the rubbing direction RD2 of the second alignment layer AL2 may be the direction Y or the direction-Y.

In the present embodiment, through the above-mentioned designs of the first alignment layer AL1 and the second alignment layer AL2, the liquid crystal molecules LCM in the viewing angle controlling medium VM may substantially be aligned in a horizontal direction and having a pretilt angle of less than or equal to 20 degrees. The liquid crystal molecules LCM may substantially aligned horizontally due to being affected or defined by the first alignment layer AL1 and the second alignment layer AL2, which may be defined as a horizontal alignment in this disclosure. In some embodiments, the pretilt angle of the liquid crystal molecules LCM may be less than or equal to 15 degrees. In some embodiments, the pretilt angle of the liquid crystal molecules LCM may be less than or equal to 10 degrees. The above-mentioned alignment of the liquid crystal molecules LCM may be shown in state (I) of FIG. 1, but not limited thereto. It should be noted that although the surface S1 of the first alignment layer AL1 may not be rubbed in some other embodiments, the liquid crystal molecules LCM may still be aligned in the way shown in state (I) by the intermolecular force between the liquid crystal molecules LCM.

In the present embodiment, the first polarizer PL1 may be disposed at a side of the first substrate SB1 away from the first alignment layer AL1, and the second polarizer PL2 may be disposed at a side of the second substrate SB2 away from the second alignment layer AL2, but not limited thereto. In the present embodiment, the polarizing axis of the first polarizer PL1 may be parallel to the direction X (i.e. the direction of 0 degree) or the direction Y (i.e. the direction of 90 degrees), and the polarizing axis of the second polarizer PL2 may be parallel to the polarizing axis of the first polarizer PL1.

As shown in FIG. 1, the viewing angle controlling device 100 further includes a first electrode EL1 and a second electrode EL2. The first electrode EL1 may be disposed between the first substrate SB1 and the first alignment layer AL1, and the second electrode EL2 may be disposed between the second substrate SB2 and the second alignment layer AL2, but not limited thereto. The first electrode EL1 and the second electrode EL2 may include any suitable transparent conductive material, such as indium tin oxide (ITO), but not limited thereto. In the present embodiment, an electric field may be generated due to the voltage difference between the first electrode EL1 and the second electrode EL2. In some embodiments, the second electrode EL2 may be provided with a common voltage, and in such condition, when the first electrode EL1 is not provided with a voltage, no electric field is generated; and when a voltage is provided to the first electrode EL1, an electric field may be generated. In some embodiments, the first electrode EL1 may be provided with a common voltage, and a voltage may be applied to the second electrode EL2 to generate an electric field. Although it is not shown in FIG. 1, the viewing angle controlling device 100 may further include a circuit layer electrically connected to the first electrode EL1 and/or the second electrode EL2 to provide voltages. The circuit layer may include any suitable active elements and/or passive elements, and the structure thereof is not limited by the present disclosure. The electric field generated through the voltage difference between the first electrode EL1 and the second electrode EL2 may make the liquid crystal molecules LCM twist to change the arrangement of the liquid crystal molecules LCM, i.e. changing the alignment state of the liquid crystal molecules LCM, thereby changing the modes of the viewing angle controlling device 100. The modes of the viewing angle controlling device 100 will be detailed in the following.

In the present embodiment, as shown in state (I) of FIG. 1, when the voltage difference is not applied between the first electrode EL1 and the second electrode EL2 (for example, the first electrode EL1 or the second electrode is not provided with a voltage), the alignment of the liquid crystal molecules LCM may be determined by the first alignment layer AL1 and/or the second alignment layer AL2. The alignment of the liquid crystal molecules LCM may refer to the contents mentioned above and is shown in state (I) of FIG. 1. In such condition, the linearly polarized light passing through the first polarizer PL1 and the viewing angle controlling medium VM can also pass through the second polarizer PL2, or the linearly polarized light passing through the second polarizer PL2 and the viewing angle controlling medium VM can also pass through the first polarizer PL1 since the axis of the first polarizer PL1 and the axis of the second polarizer PL2 are parallel to each other, and the liquid crystal molecules LCM are aligned along the same direction. Therefore, when the viewing angle controlling device 100 shown in state (I) is applied to an electronic device, such as a display device, the display device (or the viewing angle controlling device 100) may be in a sharing mode. Specifically, in the sharing mode of the display device, the viewing angle controlling device 100 may not affect the light emitted by the display device, such that the display device may display images as normal.

In detail, as shown in FIG. 2, the contour (I) of FIG. 2 shows the luminance of light passing through the viewing angle controlling device 100 in the sharing mode with the viewing angle from 0 degree (center) to 80 degrees in different directions. The direction "UP", "DOWN", "RIGHT", and "LEFT" may indicate the measuring direction of the luminance of the light. In FIG. 2, the dots are used to represent the luminance of light passing through the viewing angle controlling device 100. Specifically, a greater density of the dots represents a lower luminance of the light, while a lower density of the dots represents a greater luminance of the light. It should be noted that the direction "UP" in FIG. 2 may correspond to the direction "UP" in FIG. 1, and the direction "DOWN" in FIG. 2 may correspond to the direction "DOWN" in FIG. 1. That is, the direction "UP" in FIG. 2 may correspond to the direction Y in FIG. 1, and the direction "DOWN" in FIG. 2 may correspond to the direction-Y in FIG. 1. Similarly, the direction "RIGHT" in FIG. 2 may correspond to the direction X in FIG. 1, and the direction "LEFT" in FIG. 2 may correspond to the direction-X in FIG. 1. As shown in the contour (I) of FIG. 2, the luminance of the light passing through the viewing angle controlling device 100 in the sharing mode (shown in the state (I) in FIG. 1) may not be significantly reduced as the viewing angle is greater. That is, when the viewing angle controlling device 100 is applied to a display device, the influence of the viewing angle controlling device 100 on the display effect of the display device is not apparent.

As mentioned above, the first anchoring strength of the first alignment layer AL1 may be less than the second anchoring strength of the second alignment layer AL2. Therefore, when a voltage difference is applied between the first electrode EL1 and the second electrode EL2 and an electric field is thereby generated, the liquid crystal molecules LCM adjacent to the first alignment layer AL1 (for example, the liquid crystal molecule LCM1) may be affected by the electric field more easily than the liquid crystal molecules LCM adjacent to the second alignment layer AL2 (for example, the liquid crystal molecule LCM2). That is, the liquid crystal molecule LCM1 may rotate more easily than the liquid crystal molecule LCM2 under the influence of the electric field. For example, in some embodiments, the liquid crystal molecule LCM1 adjacent to the first alignment layer AL1 may rotate due to being affected by the electric field while the liquid crystal molecule LCM2 adjacent to the second alignment layer AL2 does not rotate since the second anchoring strength is great enough to maintain the alignment of the liquid crystal molecule LCM2.

In the present embodiment, as shown in state (II) of FIG. 1, a voltage difference V1 may be applied between the first electrode EL1 and the second electrode EL2, and therefore an electric filed is generated, wherein the liquid crystal molecules LCM adjacent to the first alignment layer AL1 (for example, the liquid crystal molecule LCM1) may be affected by the electric field and rotate while the alignment of the liquid crystal molecules LCM adjacent to the second alignment layer AL2 (for example, the liquid crystal molecule LCM2) is still unchanged under the existing of the electric field. In detail, when the voltage difference V1 is applied between the first electrode EL1 and the second electrode EL2, the liquid crystal molecules LCM adjacent to the first alignment layer AL1 may arrange in a vertical way (which may be defined as having a vertical alignment), and the liquid crystal molecules LCM adjacent to the second alignment layer AL2 may still arrange in a horizontal way (which may be defined as having a horizontal alignment) similar to the arrangement shown in state (I) of FIG. 1. In addition, the liquid crystal molecules LCM not adjacent to the first alignment layer AL1 and the second alignment layer AL2 may tilt in different degree. The tilted degree (or the tilted angle) of a liquid crystal molecule LCM may be greater as the distance between the liquid crystal molecule LCM and the second alignment layer AL2 is greater, as shown in state (II) of FIG. 1. In addition, the tilted degree of a liquid crystal molecule LCM may be affected by the strength of the electric field and/or the elastic constant of the liquid crystal molecule LCM. Therefore, when the voltage difference V1 is applied between the first electrode EL1 and the second electrode EL2, the liquid crystal molecules LCM may arrange in a hybrid way, which may be defined as having a hybrid alignment in this disclosure. Specifically, from the liquid crystal molecules LCM adjacent to the second alignment layer AL2 to the liquid crystal molecules LCM adjacent to the first alignment layer AL1, the alignment of the liquid crystal molecules LCM may gradually change from horizontal to vertical. In such condition, the luminance of light with large viewing angle may be reduced after the light passing through the viewing angle controlling device 100. Therefore, when the viewing angle controlling device 100 shown in state (II) is applied to a display device, the viewing angle controlling device 100 may provide the privacy function, and the display device (or the viewing angle controlling device 100) may be in a privacy mode, thereby achieving the effect of anti-peeping.

As shown in FIG. 2, the contour (II) of FIG. 2 shows the luminance of light passing through the viewing angle controlling device 100 in the privacy mode with the viewing angle from 0 degree (center) to 80 degrees in different directions. It can be seen from the contour (II) that when the viewing angle controlling device 100 is in the privacy mode (shown in state (II) of FIG. 1), the luminance of the light passing through the viewing angle controlling device 100 would reduce significantly as the viewing angle is greater. In the present embodiment, the "privacy mode" may include the condition in which the luminance of light at the viewing angle of 45 degrees is less than or equal to 10% of the luminance of the light at the viewing angle of 0 degree (that is, the luminance measured in the normal direction of the viewing angle controlling device 100) in the direction "RIGHT" and the direction "LEFT". That is, when the viewing angle controlling device 100 is in the privacy mode, the ratio of the luminance of light passing through the viewing angle controlling device 100 at the viewing angle of 45 degrees to the luminance of light passing through the viewing angle controlling device 100 at the viewing angle of 0 degrees may be less than or equal to 10% in the direction "RIGHT" and the direction "LEFT". Therefore, the luminance of the light at large viewing angle may be reduced through the viewing angle controlling device 100, thereby achieving the effect of anti-peeping.

It should be noted that the voltage difference V1 may be determined by considering the first anchoring strength, the second anchoring strength and/or the elastic constant of the liquid crystal molecules LCM. In detail, the voltage difference V1 may be in a certain range, such that the liquid crystal molecules LCM adjacent to the first alignment layer AL1 are rotated to be vertically aligned while the liquid crystal molecules LCM adjacent to the second alignment layer AL2 still arrange in a horizontal way under the electric field generated by the voltage difference V1, which means the alignment of the liquid crystal molecules LCM adjacent to the second alignment layer AL2 is not affected by the applied electric field. That is, the strength of the electric field generated by the voltage difference V1 is great enough to affect the alignment of the liquid crystal molecules LCM adjacent to the first alignment layer AL1 but not great enough to affect the alignment of the liquid crystal molecules LCM adjacent to the second alignment layer AL2. In some cases, when the voltage difference V1 is excessive great, all the liquid crystal molecules LCM may be affected by the electric field to align vertically, such that the display effect of the electronic device to which the viewing angle controlling device 100 is applied may be reduced. In such condition, when the viewing angle controlling device 100 is applied to a display device, the display effect of the display device may be affected by the viewing angle controlling device 100. In some cases, when the voltage difference V1 is excessive low, the privacy function provided by the present disclosure may not be significant.

Therefore, by making the first anchoring strength of the first alignment layer AL1 less than the second anchoring strength of the second alignment layer AL2, the sharing mode and the privacy mode of the viewing angle controlling device 100 may be switched by adjusting the voltage difference between the first electrode EL1 and the second electrode EL2.

It should be noted that the structure of the viewing angle controlling device 100 of the present embodiment is not limited to what is shown in FIG. 1. In some embodiments, the viewing angle controlling device 100 may further include any suitable layer and/or element according to the demands of the design of the viewing angle controlling device 100.

Other embodiments of the present disclosure will be described in the following. In order to simplify the description, the same elements or layers in the following embodiments would be labeled with the same symbol, and the features thereof will not be redundantly described.

Figure 3:
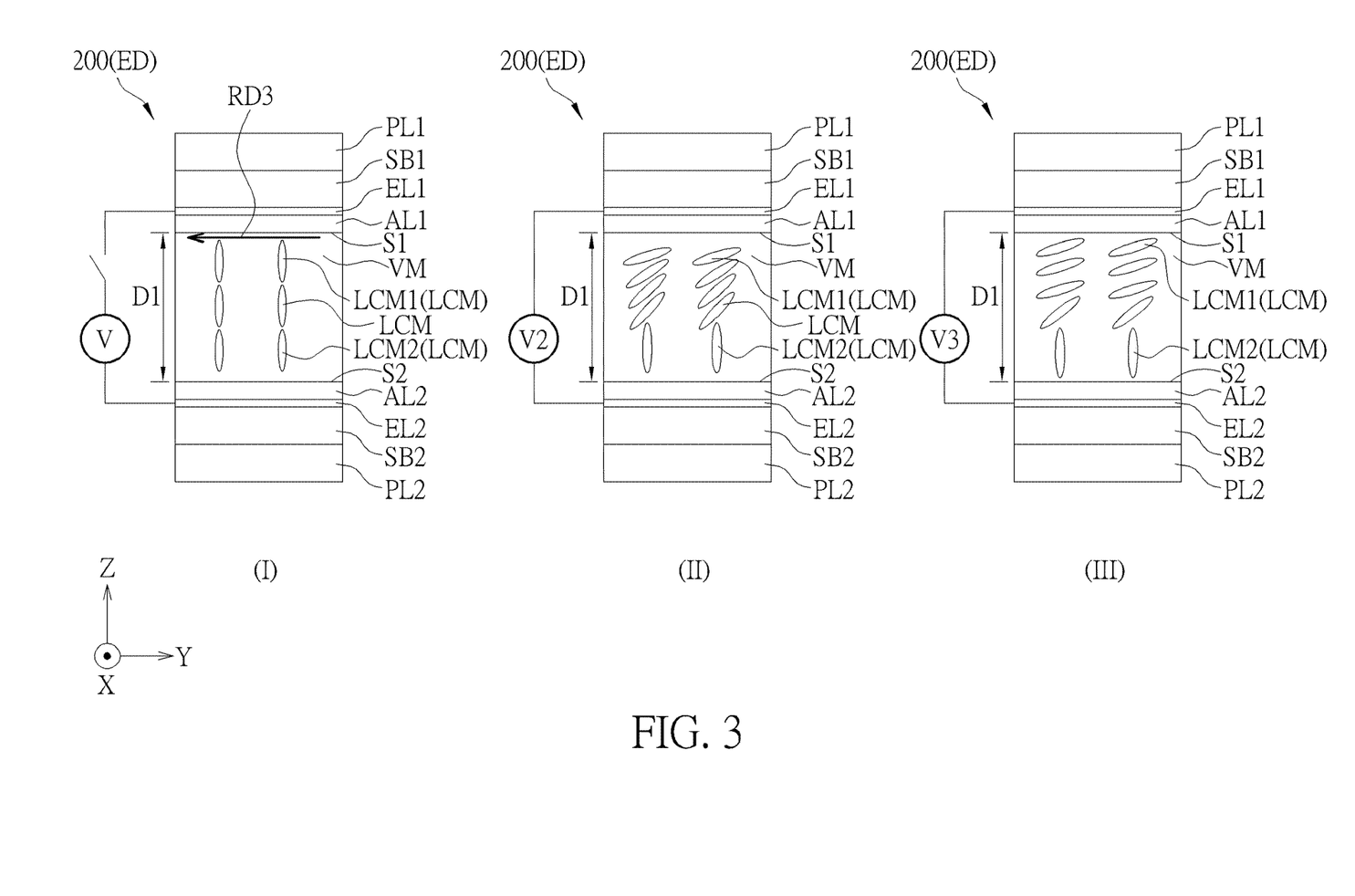
FIG. 3 schematically illustrates a cross-sectional view of an electronic device according to a second embodiment of the present disclosure.

Referring to FIG. 3, FIG. 3 schematically illustrates a cross-sectional view of an electronic device according to a second embodiment of the present disclosure. In the present embodiment, the viewing angle controlling device 200 applied to an electronic device ED includes a viewing angle controlling medium VM which may include a liquid crystal layer having a plurality of liquid crystal molecules LCM, wherein the liquid crystal molecules LCM may be negative liquid crystal molecules, but not limited thereto. According to the present embodiment, as shown in the state (I) of FIG. 3, the liquid crystal molecules LCM in the viewing angle controlling device 200 may substantially arrange in a vertical way (i.e. having a vertical alignment according to the disclosure) without the influence of electric field. In detail, the pretilt angle of the liquid crystal molecules LCM may range from 80 degrees to 90 degrees, but not limited thereto. The state (I) of FIG. 3 shows the initial state of the viewing angle controlling device 200 in which no voltage difference is applied between the first electrode EL1 and the second electrode EL2. In the present embodiment, the first anchoring strength of the first alignment layer AL1 may be less than the second anchoring strength of the second alignment layer AL2, but not limited thereto. In addition, when fabricating the viewing angle controlling device 200, a rubbing treatment may be performed on the surface of an alignment layer with the weaker anchoring strength facing the viewing angle controlling medium VM. That is, the surface S1 of the first alignment layer AL1 may be rubbed in the present embodiment, but not limited thereto. The rubbing direction RD3 of the first alignment layer AL1 may be parallel to the direction Y, for example, the direction-Y (or the direction of 270 degrees), but not limited thereto. The surface S2 of the second alignment layer AL2 may not be rubbed.

As shown in state (II) of FIG. 3, when a voltage difference V2 is applied between the first electrode EL1 and the second electrode EL2, since the first anchoring strength is less than the second anchoring strength, the liquid crystal molecules LCM adjacent to the first alignment layer AL1 (for example, the liquid crystal molecules LCM1) will rotate due to being affected by the electric field while the liquid crystal molecules LCM adjacent to the second alignment layer AL2 (for example, the liquid crystal molecules LCM2) may not rotate under existing of the electric field. For example, the liquid crystal molecules LCM adjacent to the first alignment layer AL1 may have a horizontal alignment while the liquid crystal molecules LCM adjacent to the second alignment layer AL2 may still have a vertical alignment. In addition, from the liquid crystal molecules LCM adjacent to the second alignment layer AL2 to the liquid crystal molecules LCM adjacent to the first alignment layer AL1, the alignment of the liquid crystal molecules LCM may gradually change from vertical to horizontal. That is, the liquid crystal molecules LCM may have a hybrid alignment. Since the surface S1 of the first alignment layer AL1 is rubbed during the fabrication process, the liquid crystal molecules LCM1 adjacent to the first alignment layer AL1 may be aligned along the same direction. In such condition, the luminance of light with large viewing angle can be reduced after the light passing through the viewing angle controlling device 200. Therefore, the viewing angle controlling device 200 is switched to the privacy mode when being applied with the voltage difference V2. The range of the voltage difference V2 may be determined according to the first anchoring strength, the second anchoring strength, and/or the elastic constant of the liquid crystal molecules LCM.

As shown in state (III) of FIG. 3, when a voltage difference V3 is applied between the first electrode EL1 and the second electrode EL2, the liquid crystal molecules LCM adjacent to the second alignment layer AL2 may not be affected by the electric field due to the strong second anchoring strength while other liquid crystal molecules LCM in the viewing angle controlling medium VM may rotate due to being driven by the electric field. Therefore, the liquid crystal molecules LCM adjacent to the second alignment layer AL2 may still have a vertical alignment while other liquid crystal molecules LCM may have a horizontal alignment. In such condition, the influence of the viewing angle controlling device 200 on the luminance of the light may be reduced, and the viewing angle controlling device 200 is in the sharing mode. The range of the voltage difference V3 may be determined according to the first anchoring strength, the second anchoring strength, and/or the elastic constant of the liquid crystal molecules LCM.

In the present embodiment, the voltage difference V3 may be greater than the voltage difference V2. That is, as the voltage difference between the first electrode EL1 and the second electrode EL2 becomes greater from 0, the viewing angle controlling device 200 may be switched from the initial state (shown in state (I) of FIG. 3) to the privacy mode (shown in state (II) of FIG. 3), and then be switch from the privacy mode to the sharing mode (shown in state (III) of FIG. 3). Therefore, the sharing mode and the privacy mode of the viewing angle controlling device 200 can be switched by adjusting the voltage difference between the first electrode EL1 and the second electrode EL2.

Features of other elements and/or layers of the viewing angle controlling device 200 may refer to the contents mentioned above, and will not be redundantly described.

Figure 4:
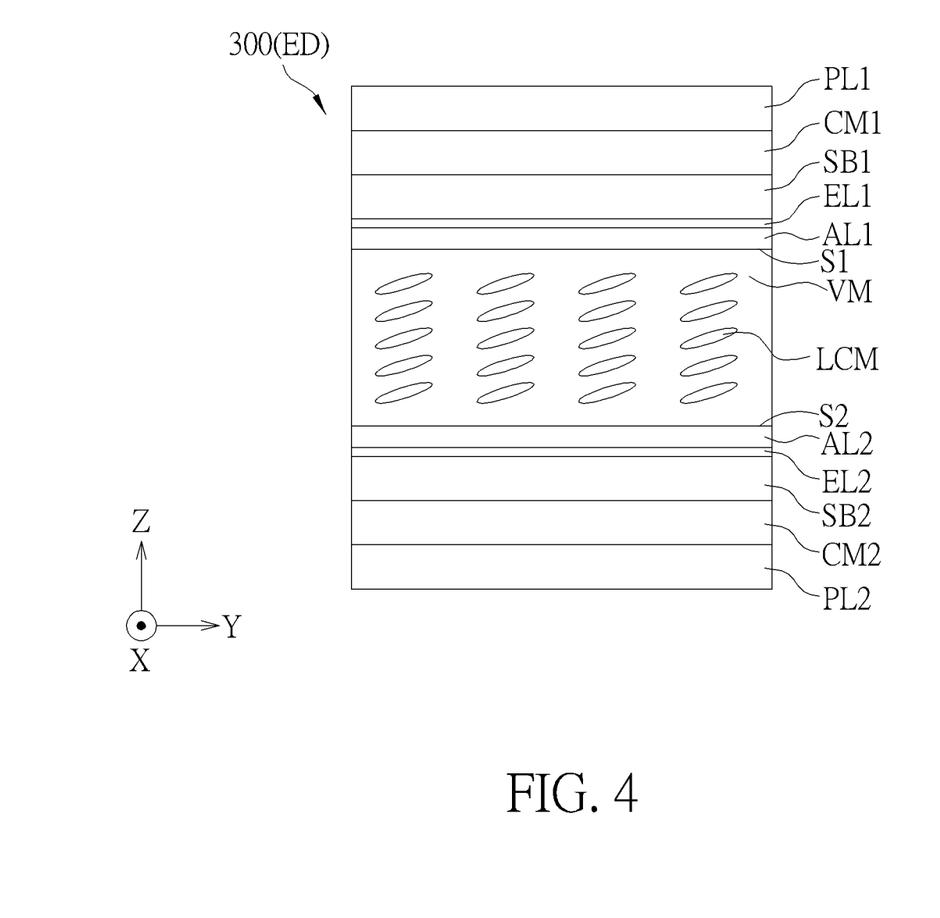
FIG. 4 schematically illustrates a cross-sectional view of an electronic device according to a third embodiment of the present disclosure.
Figure 5:
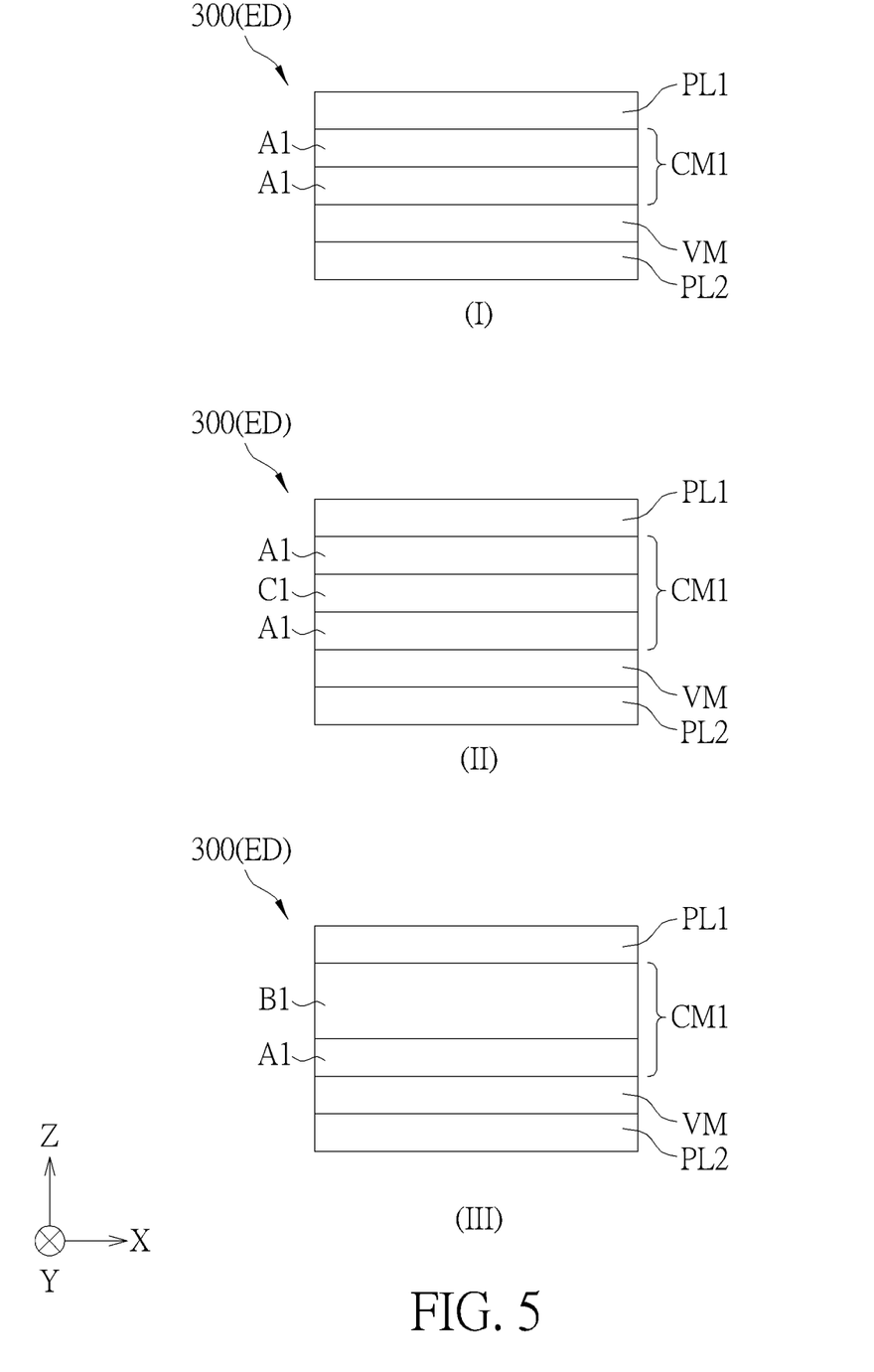
FIG. 5 shows multiple examples of the electronic device according to the third embodiment of the present disclosure.

Referring to FIG. 4 and FIG. 5, FIG. 4 schematically illustrates a cross-sectional view of an electronic device according to a third embodiment of the present disclosure, and FIG. 5 shows multiple examples of the electronic device according to the third embodiment of the present disclosure. According to the present embodiment, the viewing angle controlling device 300 applied to an electronic device ED further includes a compensation layer CM1 disposed between the first polarizer PL1 and the viewing angle controlling medium VM. For example, the compensation layer CM1 may be disposed between the first substrate SB1 and the first polarizer PL1, but not limited thereto. In some embodiments, the viewing angle controlling device 300 may further include a compensation layer CM2 disposed between the second polarizer PL2 and the viewing angle controlling medium VM. For example, the compensation layer CM2 may be disposed between the second substrate SB2 and the second polarizer PL2, but not limited thereto. In some embodiments, the viewing angle controlling device 300 may include one or two of the compensation layer CM1 and the compensation layer CM2. By disposing the compensation layer CM1 and/or the compensation layer CM2 in the viewing angle controlling device 300, when the viewing angle controlling device 300 is applied to a display device, the display effect of the display device may be improved.

In the present embodiment, the compensation layer CM1 and the compensation layer CM2 may respectively include a multi-layer structure. The multi-layer structure of the compensation layer CM1 (or the compensation layer CM2) may be formed by stacking the layers selected from a positive A-plate, a negative C-plate and a biaxial film, but not limited thereto. In some embodiments, the compensation layer CM1 (or the compensation layer CM2) may include a multi-layer structure formed by stacking other suitable layers. The features of the positive A-plate, the negative C-plate and the biaxial film will be detailed in the following.

In the present embodiment, the positive A-plate has an in-plane retardation R0, wherein the in-plane retardation R0 of the positive A-plate may be obtained through the following formula (2).

$$R0=(nx-ny)*d \tag{2}$$

wherein nx and ny are respectively the refractive index of the positive A-plate in the direction X and the direction Y, and d is the thickness of the positive A-plate.

According to the present embodiment, the in-plane retardation R0 of the positive A-plate may range from 100 nm to 300 nm, but not limited thereto.

In the present embodiment, the negative C-plate has an out-plane retardation Rth, wherein the out-plane retardation Rth of the negative C-plate may be obtained through the following formula (3).

$$Rth=\frac{1}{2}*[(nx-nz)+(ny-nz)]*d \tag{3}$$

wherein nx, ny and nz are respectively the refractive index of the negative C-plate in the direction X, the direction Y and the direction z, and d is the thickness of the negative C-plate.

According to the present embodiment, the out-plane retardation Rth of the negative C-plate may be less than 300 nm, but not limited thereto.

In the present embodiment, the biaxial film has an in-plane retardation and an out-plane retardation, wherein the in-plane retardation and the out-plane retardation may be obtained through the formulas mentioned above. According to the present embodiment, the in-plane retardation of the biaxial film may range from 50 nm to 150 nm, and the out-plane retardation of the biaxial film may range from 120 nm to 160 nm, but not limited thereto.

FIG. 5 shows examples of the compensation layer CM1 of the viewing angle controlling device 300, wherein the compensation layer CM1 may be formed by stacking layers selected from the positive A-plate A1, the biaxial film B1 and the negative C-plate C1. In order to simplify the figure, the first substrate SB1, the second substrate SB2, the first electrode EL1 and the second electrode EL2 are omitted in FIG. 5.

In example (I), the compensation layer CM1 may include two positive A-plates A1, or the compensation layer CM1 may be formed by stacking two positive A-plates A1. The in-plane retardation of the two positive A-plates A1 may be 135 nm, but not limited thereto. In some embodiments, the in-plane retardation of the two positive A-plates A1 may be 270 nm. The direction of the axis of the lower positive A-plate A1 may be the direction of 90 degrees, that is, parallel to the direction Y; the direction of the axis of the upper positive A-plate A1 may be the direction of 0 degree, that is, parallel to the direction X, but not limited thereto. In other words, the axes of the two positive A-plates A1 may be perpendicular to each other. In the present embodiment, the axis of the first polarizer PL1 and the axis of the second polarizer PL2 may be the direction of 90 degrees, that is, parallel to the direction Y.

In example (II), the compensation layer CM1 may include two positive A-plates A1 and a negative C-plate C1, wherein the negative C-plate C1 is disposed between the two positive A-plates A1. In some embodiment, the thickness of the in-plane retardation of the positive A-plate A1 is greater than the thickness of the out-plane retardation of the negative C-plate C1, but not limited thereto. The in-plane retardation of the two positive A-plates A1 may be 135 nm, but not limited thereto. The out-plane retardation of the negative C-plate C1 may be 100 nm, but not limited thereto. The direction of the axis of the lower positive A-plate A1 may be the direction of 90 degrees, that is, parallel to the direction Y. The direction of the axis of the upper positive A-plate A1 may be the direction of 0 degree, that is, parallel to the direction X. The axis of the first polarizer PL1 and the axis of the second polarizer PL2 may be the direction of 90 degrees, that is, parallel to the direction Y.

In example (III), the compensation layer CM1 may include a positive A-plate A1 and a biaxial film B1, wherein the biaxial film B1 may be disposed on the positive A-plate A1. That is, the biaxial film B1 may be disposed between the positive A-plate A1 and the first polarizer PL1. In some embodiment, the thickness of the in-plane retardation of the positive A-plate A1 is greater than the thickness of the out-plane retardation of the biaxial film B1, but not limited thereto. The in-plane retardation of the positive A-plate A1 may be 135 nm, but not limited thereto. The in-plane retardation of the biaxial film B1 may be 50 nm, and the out-plane retardation of the biaxial film B1 may be 130 nm, but not limited thereto. The direction of the axis of the positive A-plate A1 may be the direction of 90 degrees, that is, parallel to the direction Y. The direction of the axis of the biaxial film B1 may be the direction of 0 degree, that is, parallel to the direction X. The axis of the first polarizer PL1 and the axis of the second polarizer PL2 may be the direction of 90 degrees, that is, parallel to the direction Y.

It should be noted that the structures of the compensation layer CM1 shown in FIG. 5 are just exemplary, and the present disclosure is not limited thereto. Features of other elements and/or layers of the viewing angle controlling device 300 may refer to the contents mentioned above, and will not be redundantly described.

The structure of the compensation layer CM2 may refer to the above-mentioned structures of the compensation layer CM1. It should be noted that the structure of the compensation layer CM1 may be the same as or different from the structure of the compensation layer CM2.

Figure 6:
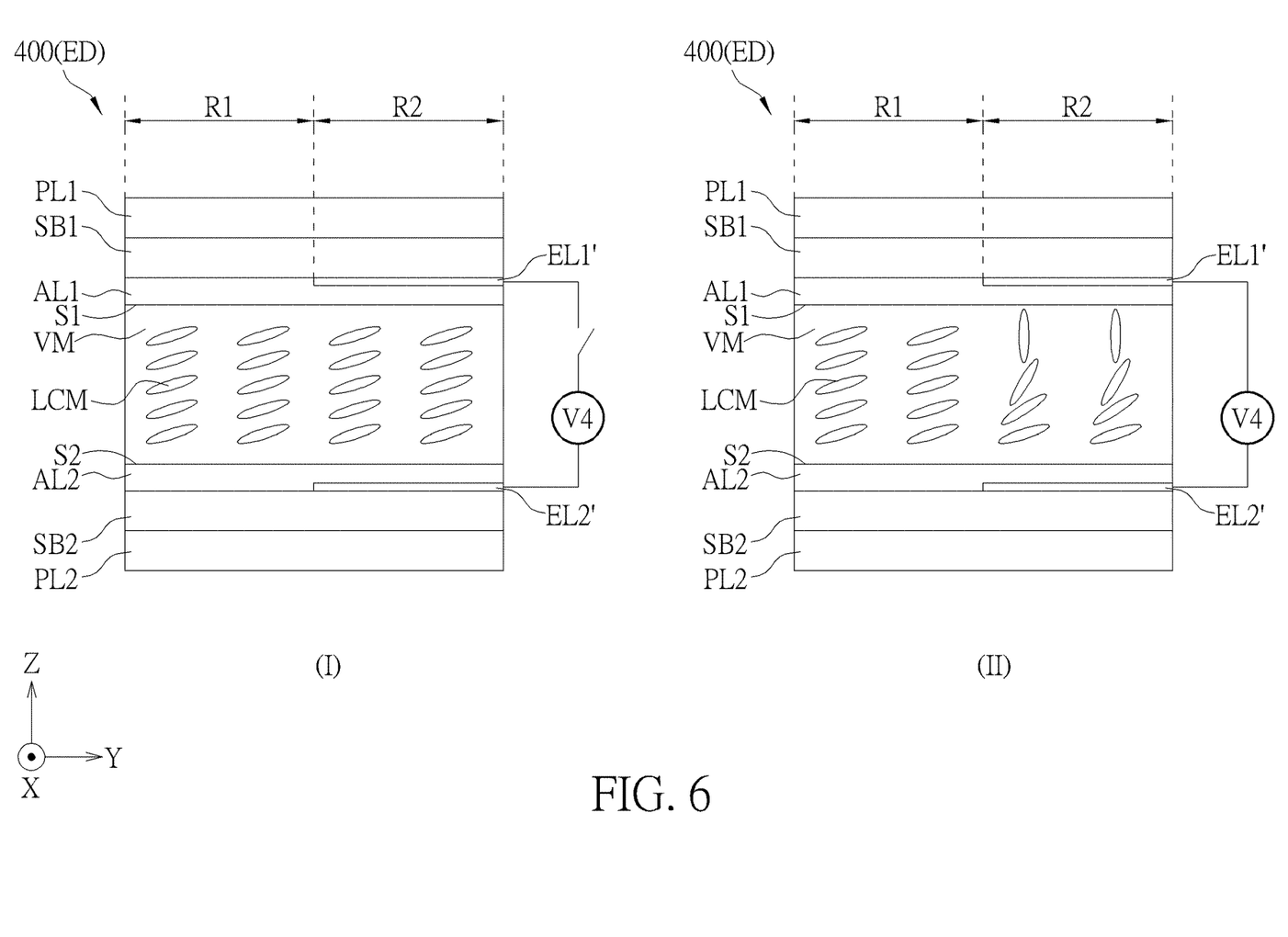
FIG. 6 schematically illustrates a cross-sectional view of an electronic device according to a fourth embodiment of the present disclosure.

Referring to FIG. 6, FIG. 6 schematically illustrates a cross-sectional view of an electronic device according to a fourth embodiment of the present disclosure. According to the present embodiment, in the viewing angle controlling device 400, the first electrode EL1' may be disposed between the first substrate SB1 and the first alignment layer AL1, and the second electrode EL2' may be disposed between the second substrate SB2 and the second alignment layer AL2. In addition, the first alignment layer AL1 may be partially overlapped with the first electrode EL1'. In detail, in the top view direction (that is, the direction Z) of the viewing angle controlling device 400, the first electrode EL1' may overlap a portion of the first alignment layer AL1, while another portion of the first alignment layer AL1 is not overlapped with the first electrode EL1'. In such condition, the first electrode EL1' may not be disposed between a portion of the first substrate SB1 and a corresponding portion of the first alignment layer AL1 in the direction Z. The second electrode EL2' may be disposed corresponding to the first electrode EL1'. That is, in the top view direction of the viewing angle controlling device 400, the second electrode EL2' may correspondingly overlap the first electrode EL1'. Accordingly, the second alignment layer AL2 may partially overlap the second electrode EL2', which means that a portion of the second alignment layer AL2 may not be overlapped with the second electrode EL2' in the direction Z.

As shown in FIG. 6, the viewing angle controlling device 400 may have a first region R1 and a second region R2, wherein the second region R2 is the region of the viewing angle controlling device 400 in which the first electrode EL1' and the second electrode EL2' are disposed, and the first region R1 may be the region of the viewing angle controlling device 400 other than the second region R2. That is, the first electrode EL1' and the second electrode EL2' are correspondingly disposed within the second region R2 but not correspondingly disposed in the first region R1. Through the above-mentioned design of the first electrode EL1' and the second electrode EL2', different regions of the viewing angle controlling device 400 may be in different modes. As shown in the state (I) of FIG. 6, when the voltage difference is not applied between the first electrode EL1' and the second electrode EL2', both of the first region R1 and the second region R2 may be in the sharing mode. As shown in state (II) of FIG. 6, when a voltage difference V4 is applied between the first electrode EL1' and the second electrode EL2', the liquid crystal molecules LCM in the second region R2 may be affected by the electric field and thereby presenting a hybrid alignment since the first anchoring strength of the first alignment layer AL1 is less than the second anchoring strength of the second alignment layer AL2 (the detail thereof may refer to the contents mentioned above, and will not be redundantly described here) while the alignment or arrangement of the liquid crystal molecules LCM in the first region R1 may not be affected by the electric field. The range of the voltage difference V4 may refer to the contents mentioned above. In such condition, the first region R1 of the viewing angle controlling device 400 may be in the sharing mode while the second region R2 of the viewing angle controlling device 400 may be in the privacy mode. Therefore, the viewing angle controlling device 400 may partially be in the privacy mode.

In some embodiments, a portion of the first alignment layer AL1 overlapped with the first electrode EL1' may have the first anchoring strength, and another portion of the first alignment layer AL1 not overlapped with the first electrode EL1' may have a third anchoring strength, wherein the first anchoring strength may be less than the third anchoring strength. For example, the third anchoring strength may be the same as the second anchoring strength of the second alignment layer AL2 which is greater than the first anchoring strength, but not limited thereto. In such design, the anchoring strength of the portion of the first alignment layer AL1 corresponding to the second region R2 may be less than the anchoring strength of the portion of the first alignment layer AL1 corresponding to the first region R1. In some embodiments, the surface of a portion of the first alignment layer AL1 overlapped with the first electrode EL1' is not rubbed while the surface of another portion of the first alignment layer AL1 not overlapped with the first electrode EL1' is rubbed during the fabrication.

It should be noted that the ranges of the first region R1 and the second region R2 shown in FIG. 6 are just exemplary, and the present embodiment is not limited thereto. The ranges of the first region R1 and the second region R2 may be determined according to the demands of the design of the viewing angle controlling device 400.

Figure 7:
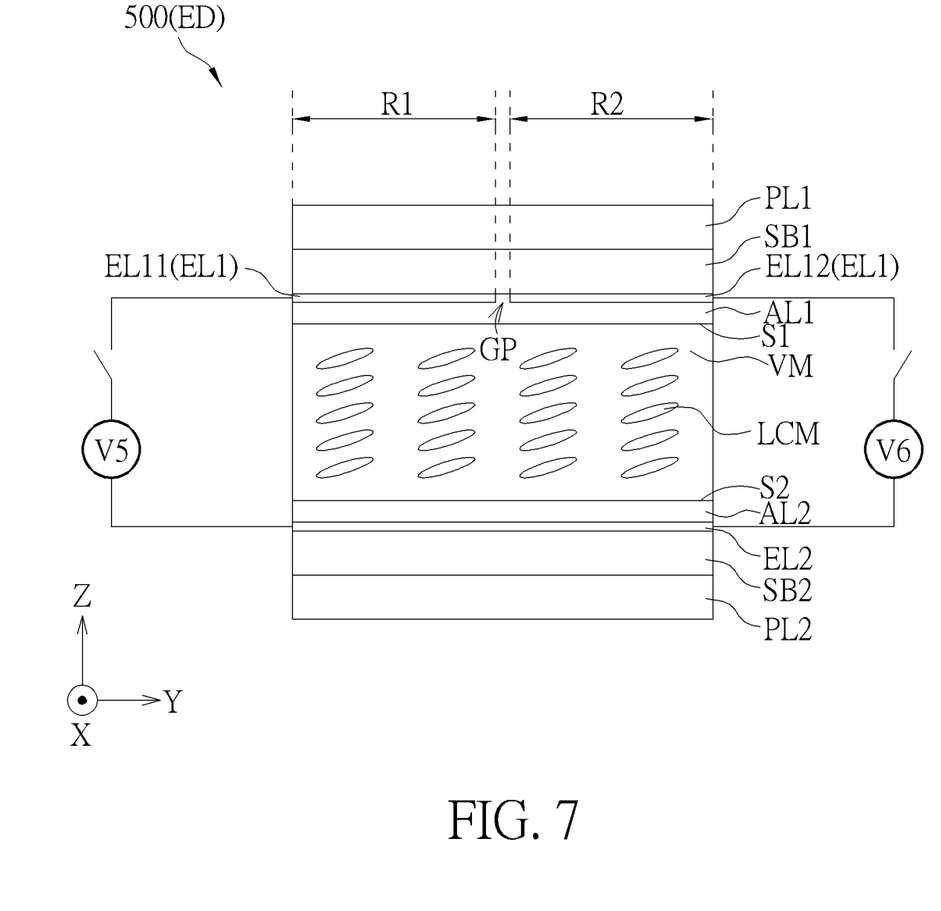
FIG. 7 schematically illustrates a cross-sectional view of an electronic device according to a fifth embodiment of the present disclosure.
Figure 8:
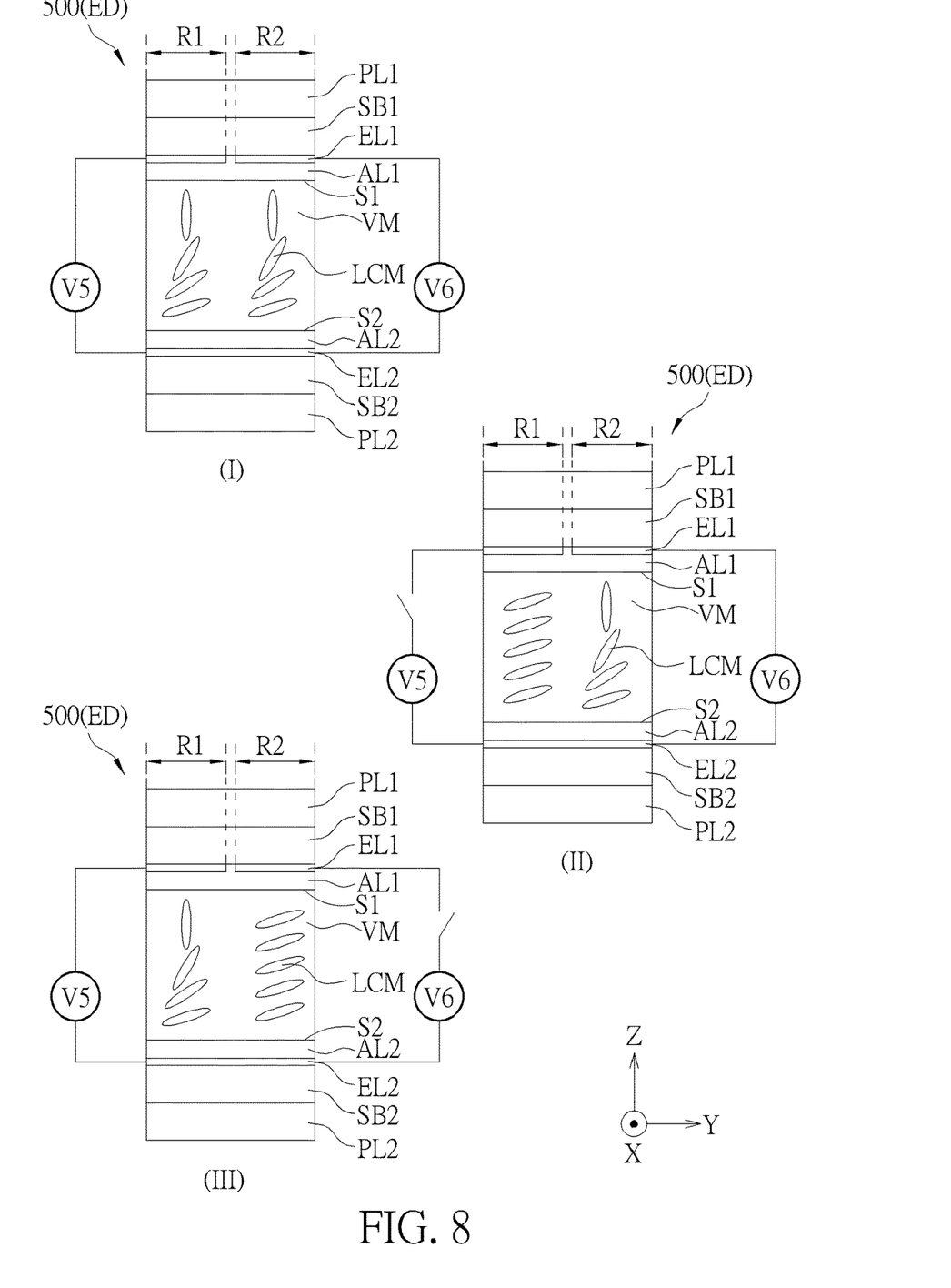
FIG. 8 shows multiple modes of the electronic device according to the fifth embodiment of the present disclosure.

Referring to FIG. 7 and FIG. 8, FIG. 7 schematically illustrates a cross-sectional view of an electronic device according to a fifth embodiment of the present disclosure, and FIG. 8 shows multiple modes of the electronic device according to the fifth embodiment of the present disclosure. According to the present embodiment, in the viewing angle controlling device 500 included in an electronic device ED, the first electrode EL1 disposed between the first substrate SB1 and the first alignment layer AL1 may be divided into a plurality of sub electrodes which are not electrically connected to each other. For example, as shown in FIG. 7, the first electrode EL1 may include a first sub electrode EL11 and a second sub electrode EL12, wherein the first sub electrode EL11 is not electrically connected to the second sub electrode EL12, and a gap GP exists between the first sub electrode EL11 and the second sub electrode EL12. In some embodiments, the first electrode EL1 may include more than two sub electrodes not electrically connected to each other and spaced apart from each other. In some other embodiments, the second electrode EL2 may include a plurality of sub electrodes while the first electrode EL1 is continuously disposed between the first substrate SB1 and the first alignment layer AL1.

As shown in FIG. 7, the sub electrodes of the first electrode EL1 may respectively correspond to different regions of the viewing angle controlling device 500. For example, the first sub electrode EL11 may correspond to a first region R1 of the viewing angle controlling device 500, and the second sub electrode EL12 may correspond to a second region R2 of the viewing angle controlling device 500. According to the present embodiment, since the sub electrodes of the first electrode EL1 corresponding to different regions of the viewing angle controlling device 500 are not electrically connected to each other, the different regions of the viewing angle controlling device 500 may be in different modes at the same time. For example, when the voltage difference is not applied between the first sub electrode EL11 and the second electrode EL2 nor between the second sub electrode EL12 and the second electrode EL2, the first region R1 and the second region R2 of the viewing angle controlling device 500 may both be in the sharing mode. In state (I) of FIG. 8, when a voltage difference V5 is applied between the first sub electrode EL11 and the second electrode EL2, and a voltage difference V6 is applied between the second sub electrode EL12 and the second electrode EL2, the first region R1 and the second region R2 of the viewing angle controlling device 500 may both be in the privacy mode. In state (II) of FIG. 8, when the voltage difference is not applied between the first sub electrode EL11 and the second electrode EL2 but the voltage difference V6 is applied between the second sub electrode EL12 and the second electrode EL2, the first region R1 may be in the sharing mode while the second region R2 may be in the privacy mode. In state (III) of FIG. 8, when the voltage difference V5 is applied between the first sub electrode EL11 and the second electrode EL2 but the voltage difference is not applied between the second sub electrode EL12 and the second electrode EL2, the first region R1 may be in the privacy mode while the second region R2 may be in the sharing mode. Therefore, the mode performed in each of the regions of the viewing angle controlling device 500 may be controlled independently. The ranges of the voltage difference V5 and the voltage difference V6 may refer to the contents mentioned above. Features of other elements and/or layers of the viewing angle controlling device 500 may refer to the contents mentioned above. The voltage difference V5 may be the same as or different from the voltage difference V6.

Figure 9:
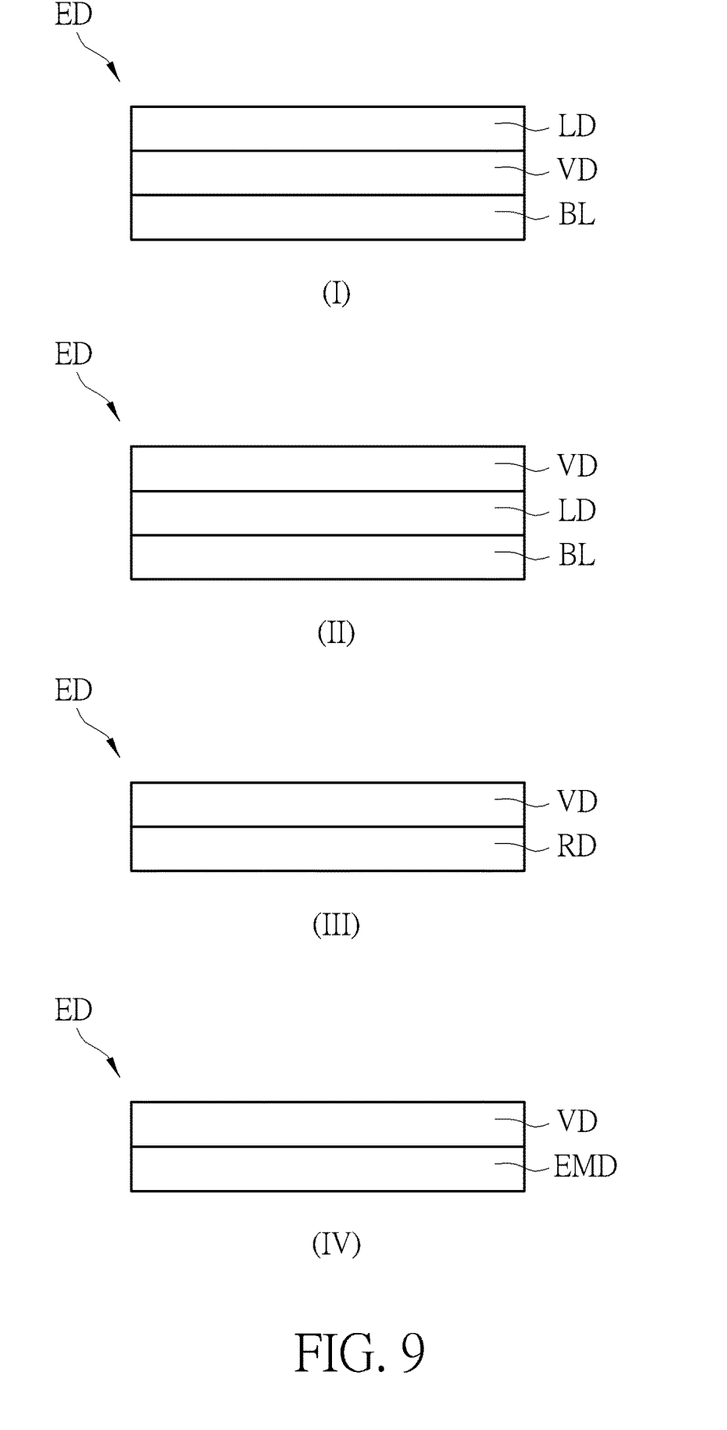
FIG. 9 shows multiple electronic devices including the viewing angle controlling device of the present disclosure.

Referring to FIG. 9, FIG. 9 shows multiple electronic devices including the viewing angle controlling device of the present disclosure. According to the present disclosure, the viewing angle controlling device VD may be applied to any suitable electronic device ED, such as display devices, but not limited thereto. The viewing angle controlling device VD mentioned here may include any of the above-mentioned viewing angle controlling devices. In some embodiments, the viewing angle controlling device VD may be applied to a non-self-emissive display device, such as a liquid crystal display device, but not limited thereto. For example, as shown in the structure (I) of FIG. 9, the viewing angle controlling device VD may be applied to a liquid crystal display device having a liquid crystal display panel LD and a backlight module BL, wherein the viewing angle controlling device VD may be disposed between the liquid crystal display panel LD and the backlight module BL. In some embodiments, as shown in the structure (II) of FIG. 9, the viewing angle controlling device VD may be disposed at a side of the liquid crystal display panel LD opposite to the backlight module BL. That is, the liquid crystal display panel LD may be disposed between the viewing angle controlling device VD and the backlight module BL. The viewing angle controlling device VD may be applied to a reflective display device. For example, as shown in the structure (III) of FIG. 9, the viewing angle controlling device VD may be disposed on a reflective display device RD, such that the light reflected by the reflective display device RD may pass through the viewing angle controlling device VD. The viewing angle controlling device VD may be applied to a self-emissive display device, such as a light emitting diode display device. The light emitting diode display device may for example include inorganic light emitting diodes or organic light emitting diodes (OLED). The inorganic light emitting diodes may for example include mini light emitting diodes (mini LED) or micro light emitting diodes (micro LED). As shown in the structure (IV) of FIG. 9, the viewing angle controlling device VD may be disposed on a self-emissive display device EMD, such that the light emitted from the self-emissive display device EMD may pass through the viewing angle controlling device VD. The applications of the viewing angle controlling device VD mentioned above are just exemplary, and the present disclosure is not limited thereto.

In summary, a viewing angle controlling device and related electronic device are provided by the present disclosure, wherein the viewing angle controlling device may include a first alignment layer having a first anchoring strength and a second alignment layer having a second anchoring strength, and the first anchoring strength is less than the second anchoring strength. The viewing angle controlling device may further include a compensation layer disposed between the first polarizer and the viewing angle controlling medium. Through the above-mentioned designs, the privacy function provided by the viewing angle controlling device may be improved while reducing the influence of the viewing angle controlling device on the display effect of the electronic device to which the viewing angle controlling device is applied.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A viewing angle controlling device, comprising:
a first substrate;
a second substrate disposed opposite to the first substrate;

a viewing angle controlling medium disposed between the first substrate and the second substrate;

a first alignment layer disposed between the first substrate and the viewing angle controlling medium and having a first anchoring strength;

a second alignment layer disposed between the second substrate and the viewing angle controlling medium and having a second anchoring strength;

a first polarizer, wherein the first substrate is disposed between the first polarizer and the first alignment layer; and a compensation layer disposed between the first polarizer and the viewing angle controlling medium, wherein the first anchoring strength is less than the second anchoring strength, wherein a material of the first alignment layer is different from a material of the second alignment layer.

2. The viewing angle controlling device of claim 1, further comprising a second polarizer, wherein the second substrate is disposed between the second polarizer and the second alignment layer.

3. The viewing angle controlling device of claim 1, wherein the compensation layer comprises two positive A-plates.

4. The viewing angle controlling device of claim 3, wherein an in-plane retardation of one of the two positive A-plates ranges from 100 nanometers to 300 nanometers.

5. The viewing angle controlling device of claim 3, wherein the compensation layer further comprises a negative C-plate disposed between the two positive A-plates.

6. The viewing angle controlling device of claim 5, wherein an out-of-plane retardation of the negative C-plate is less than 300 nanometers.

7. The viewing angle controlling device of claim 1, wherein the compensation layer comprises a positive A-plate and a biaxial film, and the biaxial film is disposed between the positive A-plate and the first polarizer.

8. The viewing angle controlling device of claim 7, wherein an in-plane retardation of the biaxial film ranges from 50 nanometers to 150 nanometers.

9. The viewing angle controlling device of claim 7, wherein an out-of-plane retardation of the biaxial film ranges from 120 to 160 nanometers.

10. The viewing angle controlling device of claim 1, further comprising another compensation layer disposed between a second polarizer and the viewing angle controlling medium.

11. The viewing angle controlling device of claim 1, further comprising a first electrode disposed between the first substrate and the first alignment layer, and a second electrode disposed between the second substrate and the second alignment layer.

12. The viewing angle controlling device of claim 11, wherein the first electrode is disposed between the first substrate and the first alignment layer, and the first alignment layer partially overlaps the first electrode.

13. The viewing angle controlling device of claim 12, wherein an anchoring strength of a portion of the first alignment layer overlapped with the first electrode is less than an anchoring strength of another portion of the first alignment layer not overlapped with the first electrode.

14. The viewing angle controlling device of claim 12, wherein the second electrode is disposed between the second substrate and the second alignment layer, and in a top view of the viewing angle controlling device, the second electrode overlaps the first electrode.

15. The viewing angle controlling device of claim 11, wherein the first electrode comprises a first sub electrode and a second sub electrode, and the first sub electrode is not electrically connected to the second sub electrode.

16. The viewing angle controlling device of claim 1, wherein the second anchoring strength is greater than $1.0*10^{-4}$ J/m$^2$.

17. The viewing angle controlling device of claim 1, wherein the material of the second alignment layer comprises polyimide or polyacrylic acid.

18. A viewing angle controlling device, comprising:
a first substrate;
a second substrate disposed opposite to the first substrate;
a viewing angle controlling medium disposed between the first substrate and the second substrate;
a first alignment layer disposed between the first substrate and the viewing angle controlling medium and having a first anchoring strength;
a second alignment layer disposed between the second substrate and the viewing angle controlling medium and having a second anchoring strength;
a first polarizer, wherein the first substrate is disposed between the first polarizer and the first alignment layer; and
a compensation layer disposed between the first polarizer and the viewing angle controlling medium,
wherein the first anchoring strength is less than the second anchoring strength,
wherein the first anchoring strength is less than $1.0*10^{-6}$ J/m$^2$.

19. A viewing angle controlling device, comprising:
a first substrate;
a second substrate disposed opposite to the first substrate;
a viewing angle controlling medium disposed between the first substrate and the second substrate;
a first alignment layer disposed between the first substrate and the viewing angle controlling medium and having a first anchoring strength;
a second alignment layer disposed between the second substrate and the viewing angle controlling medium and having a second anchoring strength;
a first polarizer, wherein the first substrate is disposed between the first polarizer and the first alignment layer; and
a compensation layer disposed between the first polarizer and the viewing angle controlling medium,
wherein the first anchoring strength is less than the second anchoring strength,
wherein a retardation of the viewing angle controlling medium is greater than 1000 nanometers.

* * * * *